United States Patent [19]

Codina

[11] Patent Number: 4,840,839
[45] Date of Patent: Jun. 20, 1989

[54] THERMOPLASTIC MASS PASSED BETWEEN ROLLERS

[75] Inventor: Francisco C. Codina, Sant Just Desvern, Spain

[73] Assignee: Texsa, S.A., Barcelona, Spain

[21] Appl. No.: 86,291

[22] Filed: Apr. 27, 1987

[30] Foreign Application Priority Data

May 5, 1986 [ES] Spain ................................. 554644

[51] Int. Cl.$^4$ .......................... C08K 5/01; C08K 3/34; C08K 3/36; B32B 5/16
[52] U.S. Cl. .................................. 428/240; 428/241; 428/260; 428/290; 524/297; 524/425; 524/427; 524/442; 524/443; 524/451; 524/484
[58] Field of Search ............... 428/240, 241, 260, 290; 524/425, 427, 484, 451, 442, 443, 297

[56] References Cited

U.S. PATENT DOCUMENTS

| | | | |
|---|---|---|---|
| 4,010,128 | 3/1977 | Saggese et al. | 524/385 |
| 4,098,739 | 7/1978 | Westermann | 524/484 |
| 4,122,062 | 10/1978 | Monte et al. | 524/425 |
| 4,343,856 | 8/1982 | Goswami et al. | 428/337 |
| 4,544,685 | 10/1985 | Hoelzer | 524/569 |
| 4,707,522 | 11/1987 | Stephens et al. | 325/534.1 |

*Primary Examiner*—Herbert J. Lilling
*Attorney, Agent, or Firm*—Bell, Seltzer, Park & Gibson

[57] ABSTRACT

A thermoplastic mass passed between rollers consisting of a mixture, the essential components of which are: from 4 to 60% in weight of an oil having a saturate content, as determined by ASTM D 2007, below 15% in weight and with a high aromatic content; from 1 to 50% in weight of chlorinated polyethylene, having a chlorine content lying between 20 and 95% in weight; and from 20 to 90% in weight of fillers.

15 Claims, No Drawings

THERMOPLASTIC MASS PASSED BETWEEN ROLLERS

BACKGROUND OF THE INVENTION

1. Field of the Invention

This invention relates to a thermoplastic mass passed between rollers, particularly useful for water and soundproofing.

2. Description of the prior Art

The preparation of sheet-like materials of chlorinated polyethylene (CPE) alone or blended with chlorosulphonated polyethylene to obtain a thermoplastic mass having characteristics more resembling those of a rubber, with the excellent properties of the CPE rather than those of a modified asphalt, is well known, as disclosed in British pat. Nos. 1,250,756, 1,475,924 and 1,531,872, U.S. Pat. No. 3,753,938, European pat. No. 031,235 and German pat. No. 2545,914. They are basically blends of a high polymer content with an asphalt base having a high softening point and low penetration. This asphalt base must be strongly aromatic with a low saturate content, to achieve homogenous blends usable in facilities similar to a rubber plant and to obtain high quality sheets which may be better handled in application than the pure products.

SUMMARY OF THE INVENTION

The invention consists of preparing easily handleable masses having a low CPE content, which is achieved by extending the CPE in oils and/or plasticizers and adding a high percentage of filler. If it is wanted to modify any of the properties of this mass, such as, for example, the heat stability thereof, additives known hereinafter as "hardeners" may be included therein.

The thermoplastic mass passed between rollers of the invention is characterised in that it is formed by a mixture, the essential components of which are: from 4 to 60% in weight of an oil having a saturate content, as determined by ASTM D 2007, below 15% in weight and preferably below 10%, with a high aromatic content; from 1 to 50% in weight of chlorinated polyethylene, having a chlorine content lying between 20 and 95% in weight; and from 20 to 90% in weight of fillers, constituted by finely divided powder of a product chosen from the group comprising calcium carbonate, silica, slate, talc, barium sulphate and others commonly used in the plastics industry or mixtures thereof.

According to a further feature of the invention, the mass includes colouring, stabilizing, lubricating, fireproofing, anti-oxidant agents and other additives generally used in good practice.

As an alternative according to the invention, said oil is at least partly substituted by ethylbenzene, dibutyl phthalate or plasticizers commonly used to plasticize polyvinyl chloride; also, said chlorinated polyethylene is partly substituted by chlorosulphonated polyethylene.

In a further development of the invention hardeners with some degree of crystallinity are included in the mass and preferably said hardeners are selected from the group formed by polyolefins, copolymers and terpolymers thereof, polystyrenes, polybutenes and polyvinyl chloride.

The most appropriate oils are the strongly aromatic ones, preferably those obtained by furfural extraction or by any other dearomatization treatment, such as the extacts obtained with phenol, N-methylpyrrolidone, etc. Basically, these oils should have a low saturate content, less than 10% and a high aromatic content, as determined by ASTM D2007. These oils are very compatible with the CPE alone or mixed with chlorosulphonated polyethylene. Other oils, such as the alkylbenzenes, which are generally more expensive or less effective and the traditional plasticizers, mainly those used for PVC, may also be used.

The present invention contemplates the plasticization or extension of halogenated and sulfphahalogenated polyethylene derivatives, with a halogen content lying between 20% and 95%, mainly the types of CPE available on the market.

To the polymer which has been plasticized or extended with the appropriate oil, a high percentage of fillers, may be added to suppress the initial take of the polymer-oil mixture. As fillers, as said above, the regular ones in the plastics industry may be, such as calcium carbonate, powdered slate, talc, barium sulphate, etc in finely divided powder form.

To modify any of the properties of the oil-polymer-filler mixture and, particularly, to improve its temperature resistance, a number of products may be added thereto acting as what will be called "hardeners", among which there are to be found, for example, the high and low density polyolefins, the copolymers and terpolymers thereof, the polybutenes, PVC, the most interesting being those having a certain degree of crystallinity.

To the mixture resulting from the use of the above mentioned products, additives proper to good practice with this type of polymers may be added, such as lubricants, antioxidants, stabilizers, etc.

The mixture may also be coloured and have the fireproofing properties proper to the halogenated derivatives improved by adding to the mixture synergetic fire-proofing products such as antimony oxides, hydrated aluminium oxides, chloroparaffins, etc.

A mixture prepared by the above processes may be rolled or extruded, but generally it may be fed through the rollers of construction inferior to that of a calender. Normally, for sound proofing purposes, a reinforcement is not required although it is attached to a sheet of felt or the like, but a reinforcement is desirable for waterproofing purposes and the mass of the invention is applied to one or both sides mainly of a fabric, a nonwoven fabric, etc., but also any traditional reinforcement may be used in such sheets, such as glass fibre blankets or fabrics, raffias, paper, etc.

To facilitate the understanding of the foregoing ideas, these are summarised hereinafter in form of a Table of schematic examples of compositions according to the invention which, in view of their merely illustrative nature, should be deemed to be devoid of any limitation with respect to the scope of legal protection being applied for. The Table also gives properties of said compositions.

The thermoplastic masses described hereinafter were prepared by first mixing the oil with the filler and the good practice additives and the "hardeners" in a Werner type double Z or loop type open mixer, while holding the temperature of the mass metween 80° and 120° C. Thereafter the CPE was added and the temperature was raised to above 130°, while being kept below 200° C.

|  | EXAMPLE | | | | | | | | |
| --- | --- | --- | --- | --- | --- | --- | --- | --- | --- |
|  | I | II | III | IV | V | VI | VII | VIII | IX |
| FORMULATION | | | | | | | | | |
| Oil[(1)] | 1000 | 1000 | — | 2000 | 1000 | 1000 | 1000 | 1000 | 1000 |
| Alkylbenzene | 250 | — | — | — | — | — | — | — | — |
| Filler (CO$_3$Ca) | 3000 | 1000 | 1500 | 3000 | 3000 | 3000 | 6000 | 3000 | 4000 |
| PE | 100 | — | — | 400 | — | 100 | 50 | 100 | 500 |
| CPE | 400 | 500 | 1000 | 400 | 400 | 3000 | 50 | 400 | 200 |
| Dibutylphthalate | — | — | 1000 | — | — | — | — | — | — |
| PROPERTIES | | | | | | | | | |
| Penetration ASTM D-5 mm/10 | 42 | 64 | 51 | 61 | 40 | 21 | 75 | 36 | 34 |
| Fragility ASTM D-228 °C. | −35 | −25 | −30 | −29 | — | −30 | −5 | −20 | −12 |
| Elongation UEA tc % | L 647 T 675 | — | — | L 676 T 736 | L 874 T 1148 | — | — | L 941 T 1071 | L 791 T 745 |
| Tensile strength UEA tc kg/5 cm | L 3,5 T 4,1 | — | — | L 15 T 12 | L 9 T 6 | — | — | L 4,5 T 5 | L 1,7 T 1,7 |

[(1)]The oil has a composition determined by ASTM D2007 of: saturates 7%, aromatics 81% and polar solvents 12%.

What I claim is:

1. A thermoplastic mass comprising from about 8 to 60 percent of a highly aromatic oil having a saturate content of below 15 percent by weight, from 1 to 50 percent by weight of chlorinated polyethylene having a chlorine content lying between 20 and 95 percent by weight, and from about 20 to 90 percent by weight of a finely divided powder filler.

2. The thermoplastic mass of claim 1, characterized in that it includes colouring, stabilizing, lubricating, fireproofing and antioxidant agents.

3. The thermoplastic mass of claim 1, characterized in that said oil contains a proportion of ethyl benzene or dibutyl phthalate.

4. The thermoplastic mass of claim 1, characterized in that it is formed into a sheet or in rolls.

5. The thermoplastic mass of claim 1, characterized in that it is applied to at least one of the sides of a sheet-like structure selected from the group consisting of a fabric, a fibre web of a nonwoven fabric when used for waterproofing purposes.

6. The thermoplastic mass of claim 1, characterized in that it is applied to at least one face of a surface for sound-proofing and/or vibration dampening purposes.

7. The thermoplastic mass of claim 1, characterized in that said mass additionally includes a polyolefin hardener.

8. The thermoplastic mass of claim 1, characterized in that said oil has a saturate content of below 10 percent by weight.

9. The thermoplastic mass of claim 1, characterized in that said finely divided powder is selected from a group consisting of calcium carbonate, silica, slate, talc and barium sulphate.

10. A thermoplastic mass comprising from about 8 to 60 percent of a highly aromatic oil having a saturate content of below 15 percent by weight, from 1 to 50 percent by weight of chlorinated polyethylene having a chlorine content lying between 20 and 95 percent by weight, and wherein the amount of highly aromatic oil is greater than the amount of chlorinated polyethylene, and from about 20 to 90 percent by weight of a finely divided powder filler.

11. The thermoplastic mass of claim 10, characterized in that it includes colouring, stabilizing, lubricating, fireproofing, and antioxidant agents.

12. The thermoplastic mass of claim 10, characterized in said oil contains a proportion of ethyl benzene, dibutyl phthalate or plasticizers of normal use for plasticizing polyvinyl chloride.

13. The thermoplastic mass of claim 10, characterized in that said mass additionally includes a polyolefin hardener.

14. The thermoplastic mass of claim 10, characterized in that said oil has a saturate content of below 10 percent by weight.

15. The thermoplastic mass of claim 10, characterized in that said finely divided powder is selected from a group consisting of calcium carbonate, silica, slate, talc, and barium sulphate.

* * * * *